UNITED STATES PATENT OFFICE.

ALFRED VALENTINE CUNNINGTON, OF WINNINGTON, ENGLAND.

EXTRACTION AND PURIFICATION OF ZINC.

No. 803,472.   Specification of Letters Patent.   Patented Oct. 31, 1905.

Application filed July 20, 1904. Serial No. 217,395.

*To all whom it may concern:*

Be it known that I, ALFRED VALENTINE CUNNINGTON, manufacturing chemist, a subject of the King of Great Britain, residing at Winnington, in the county of Chester, in the Kingdom of England, have invented certain new and useful Improvements in the Extraction and Purification of Zinc, (for which application has been made in Great Britain, No. 4,706, dated February 24, 1904,) of which the following is a specification.

This invention relates to an improved process for the treatment of materials containing zinc—such as blende, calamine, zinciferous pyrites, and the like—for the purpose of obtaining the zinc contained therein in a state of solution. The ordinary method of treating such materials with acid for the purpose of obtaining their metallic contents in solution is attended with various difficulties which render it almost impracticable. The following are two of the greatest of these difficulties: When a zinc compound—such as roasted or unroasted blende, zinciferous pyrites, calamine, &c.—is treated with an acid—for example, hydrochloric acid—any silicates which may be present are mostly decomposed, forming a very bulky mass of gelatinous silica, which it is practically impossible to filter and wash, and consequently much of the strong liquor obtained is lost. Moreover, if the materials thus leached contain iron in any form the greater part, if not the whole, of the iron goes into solution, and if it is wished to remove it it must be precipitated by means of lime, zinc oxid, or the like, which again gives rise to the formation of a very bulky and slimy mass of iron hydroxid, which is also exceedingly difficult to filter and wash. My invention entirely obviates these difficulties and is also much more easily and simply carried out.

By my process materials containing zinc may readily be treated without leading to the formation of gelatinous silica or the solution of any considerable quantity of iron which may accompany the zinc.

According to my invention the "ore" is thoroughly calcined and preferably brought to the condition of fine powder. If it contain a large quantity of iron, it is sometimes best to partially reduce the iron by producer-gas or otherwise after roasting. The powder is introduced into a strong solution of zinc chlorid. I have found a solution containing twenty to thirty per cent. zinc to work satisfactorily; but solutions of other strengths may also be employed. In the case of calamine ores previous calcination, although preferable, is not absolutely necessary. The zinc which is present in the material thus treated immediately combines with the zinc chlorid, and oxychlorids of zinc are formed, which are reconverted into the chlorid on the addition of hydrochloric acid. Thus the process is continuous, ore and acid in regulated quantities being added simultaneously.

In the carrying out of this process two points should have special attention. First, efficient stirring is necessary in order to avoid the possible formation of hard lumps; second, the solution should be kept about neutral. If allowed to get too acid, gelatinous silica may be formed and a considerable quantity of the iron compounds dissolved.

I have found that the leaching solution may be worked up to as high as two per cent. free HCl without leading to these consequences, and in practice it is a simple matter to work below this limit. A cold solution of zinc chlorid may be used in the initial stage of the process, no appreciable advantage being obtained by previously heating it. While the process continues heat is evolved, and after a time steam may be given off; but acid fumes may be avoided entirely provided care be taken to introduce the hydrochloric acid below the surface of the liquor in the dissolving vessel. The acid used should be sufficiently strong to keep up the concentration of the leach, as the reaction then proceeds more readily. In this way a strong solution of zinc chlorid may easily be obtained, containing only traces of iron in solution, even when the materials leached are comparatively rich in this metal. This solution may readily be made of a specific gravity as high as 1.450 when using hydrochloric acid containing thirty per cent. HCl by volume. More concentrated acid leads to the production of still denser solutions.

In some cases it may be advisable to condense hydrochloric-acid gas in solutions of zinc chlorid and use this mixture for adding to the leach during the operation. In others hydrochloric-acid gas may be led into the leach itself during the addition of the ore.

The solution obtained by the above process settles rapidly and the gangue can readily be filtered and washed. Purification may be effected by electrolytic or by the well-known chemical methods. Thus the iron and manganese may be precipitated by the addition of zinc oxid, lime, &c. In some cases a previous oxidation by means of air or the addition of bleaching-powder or the like may be necessary.

The heavier metals—such as lead, copper, cadmium, &c.—are conveniently thrown out with the aid of metallic zinc, either in the form of sheets, bars, &c., or as zinc-dust.

The chlorid of zinc thus formed can be evaporated or can be at once submitted to the electrolytic process and zinc obtained therefrom. It is exceedingly important, however, that the solution should be free from arsenic. The presence of arsenic not only interferes with the deposit of the zinc in the electrolytic process, but also, no matter how the zinc is finally obtained, renders it impure. With the object, therefore, of removing the arsenic which is very likely to be present both from the original hydrochloric acid and from the ores themselves I bring the solution into contact with freshly-precipitated ferric hydroxid and by this means form an insoluble compound of arsenic and iron. This can be effected in one or more ways. Thus, First. A quantity of freshly-precipitated ferric hydroxid made by any of the well-known chemical methods is added to the liquor to be purified and well mixed by stirring. The liquor should be neutral or alkaline and free from iron at the end of the operation in order to effect the removal of the arsenic.

Second. Iron hydroxid is precipitated in the liquor itself by taking care that the said liquor contains ferric iron in solution and adding to it zinc oxid, lime, or the like in quantities sufficient to completely precipitate the iron.

It should be noted that a certain quantity of iron hydroxid must be present to effect complete removal of the arsenic, and by experiment I have found that five to eight parts of iron in the form of hydroxid are sufficient to throw out one part of arsenic in the above process.

The liquors thus purified may be either hot or cold and the arsenic may be present in the arsenious or arsenic form with practically the same results.

In thus describing my invention I wish to point out that though I have only mentioned the employment of hydrochloric acid and the formation of zinc chlorid, yet other acids may also be used, resulting in the production of the corresponding salts. Thus, starting with a strong solution of zinc sulfate, I may add to it the zinc-containing material, together with sulfuric acid sufficiently dilute, and obtain in a similar manner finally a concentrated solution of sulfate of zinc. I have mentioned, too, the methods I propose to adopt for obtaining the solution of chlorid of zinc free from other metals and arsenic; but it is obvious that for some purposes, such as pickling timber and even for making zinc-white, the crude zinc-chlorid liquor or liquor made of equivalent salt of zinc can be used without this purification.

I declare that what I claim is—

1. The process of obtaining a zinc salt from ores containing zinc which consists in stirring them with a solution of a zinc salt together with the acid which forms that salt the solution being kept about neutral and finally separating the solution from the spent residue.

2. The process of obtaining a zinc salt from ores containing zinc which consists in calcining and powdering the ore, treating them with a solution of a zinc salt and the acid which forms that salt—the solution being maintained throughout about neutral, and finally separating the solution from the spent residue.

3. The process of obtaining zinc from its ores which consists in calcining and comminuting the ores, treating them with a solution of a zinc salt together with the acid that forms that salt, the solution being kept about neutral, separating the solution from the spent residue, and obtaining the zinc therefrom in any ordinary manner.

4. In the process of obtaining zinc from oxidized ores treating them with zinc-chlorid solution and hydrochloric acid with constant stirring, the solution being kept about neutral during the operation and separating the solution from the spent residue.

5. In the process of dissolving out zinc from its ores containing arsenic by means of a solution of a salt of zinc and the acid of said salt, neutralizing the solution by the addition of an alkali and then separating the arsenic by means of freshly-precipitated ferric hydroxid.

In witness whereof I have hereunto signed my name, this 23d day of June, 1904, in the presence of two subscribing witnesses.

ALFRED VALENTINE CUNNINGTON.

Witnesses:
THOMAS S. SHILLINGTON,
H. WATSON.